(12) United States Patent
Jeong et al.

(10) Patent No.: US 10,180,221 B1
(45) Date of Patent: Jan. 15, 2019

(54) MODULAR SOLAR-POWERED LIGHTING DEVICES AND COMPONENTS THEREOF

(71) Applicant: MPOWERD Inc., Brooklyn, NY (US)

(72) Inventors: Seungah Jeong, Brooklyn, NY (US); John Salzinger, Brooklyn, NY (US); Mehmet Mailmail, New York, NY (US)

(73) Assignee: MPOWERD Inc., Brooklyn, NY (US)

( * ) Notice: Subject to any disclaimer, the term of this patent is extended or adjusted under 35 U.S.C. 154(b) by 0 days.

(21) Appl. No.: 15/894,727

(22) Filed: Feb. 12, 2018

(51) Int. Cl.
| | |
|---|---|
| *F21L 4/08* | (2006.01) |
| *F21S 9/03* | (2006.01) |
| *F21V 23/06* | (2006.01) |
| *F21L 4/02* | (2006.01) |
| *F21Y 115/10* | (2016.01) |

(52) U.S. Cl.
CPC ............... *F21S 9/032* (2013.01); *F21L 4/027* (2013.01); *F21L 4/08* (2013.01); *F21V 23/06* (2013.01); *F21Y 2115/10* (2016.08)

(58) Field of Classification Search
CPC .......... F21S 9/032; F21V 23/06; F21V 23/04; F21Y 2115/10; F21L 4/027; F21L 4/08; F21L 4/00
See application file for complete search history.

(56) References Cited

U.S. PATENT DOCUMENTS

| | | | |
|---|---|---|---|
| 5,237,490 A * | 8/1993 | Ferng ..................... | F21S 9/037 136/291 |
| 5,782,552 A | 7/1998 | Green | |
| 5,888,156 A | 3/1999 | Cmiel | |
| 5,947,581 A | 9/1999 | Schrimmer et al. | |
| 6,013,985 A | 1/2000 | Green et al. | |
| 6,193,392 B1 | 2/2001 | Lodhie | |
| 6,897,832 B2 | 5/2005 | Essig, Jr. et al. | |

(Continued)

FOREIGN PATENT DOCUMENTS

| | | |
|---|---|---|
| CA | 152065 | 5/2014 |
| CN | 1162496 A | 10/1997 |

(Continued)

OTHER PUBLICATIONS

Ashan et al. "Solar Powered Lantern for Flood Affected Areas," *Power Engineering Society Winter Meeting*, 2000, pp. 487-492.

(Continued)

*Primary Examiner* — Peggy Neils
(74) *Attorney, Agent, or Firm* — Bookoff McAndrews, PLLC (57) ABSTRACT

Modular solar devices and kits of various components for assembling such devices are described. The kit may include a lighting component, one or more lights, a power storage component, and/or a solar component. The lighting component may include a control circuit and at least one light connector operably coupled to the first control circuit, wherein the light(s) may be configured to electrically connect to the light connector(s). The power storage component may include a control circuit and at least one rechargeable battery operably coupled to the control circuit. The solar component may include a solar panel, e.g., the solar component being configured to supply electricity generated by the solar panel to the power storage component and/or the lighting component to illuminate the light(s).

21 Claims, 7 Drawing Sheets

(56) References Cited

U.S. PATENT DOCUMENTS

| | | |
|---|---|---|
| 7,073,462 B1 | 7/2006 | Layman et al. |
| 7,377,667 B2 | 5/2008 | Richmond |
| 7,377,677 B2 | 5/2008 | Kang et al. |
| 7,513,638 B2 | 4/2009 | Allsop et al. |
| 7,524,079 B2 * | 4/2009 | Greenhoe ............. F21S 9/032 362/183 |
| 7,690,812 B2 | 4/2010 | Roberts |
| 7,753,576 B2 | 7/2010 | Marcinkewicz et al. |
| 7,825,325 B2 | 11/2010 | Kennedy et al. |
| 7,857,490 B1 | 12/2010 | Fett |
| 8,410,748 B2 | 4/2013 | Wilson |
| 8,674,211 B1 | 3/2014 | Palmer et al. |
| 8,823,315 B2 | 9/2014 | Oppizzi |
| 8,845,126 B1 * | 9/2014 | Martzall ............... F21S 8/022 362/183 |
| 9,016,886 B2 | 4/2015 | Snyder |
| 9,080,736 B1 | 7/2015 | Salzinger et al. |
| 9,194,563 B2 | 11/2015 | Snyder |
| 9,200,767 B2 | 12/2015 | Katsaros |
| 9,200,770 B2 | 12/2015 | Chun |
| 9,206,952 B2 | 12/2015 | Gold et al. |
| 9,255,675 B1 | 2/2016 | Salzinger et al. |
| 9,410,666 B2 * | 8/2016 | Camenzuli ............. F21L 4/08 |
| 9,638,399 B2 | 5/2017 | Snyder |
| 2004/0130888 A1 | 7/2004 | Twardawski |
| 2005/0002188 A1 | 1/2005 | Bucher et al. |
| 2005/0265029 A1 | 12/2005 | Epstein et al. |
| 2006/0108612 A1 | 5/2006 | Richmond |
| 2006/0291217 A1 | 12/2006 | Vanderschuit |
| 2007/0014125 A1 | 1/2007 | Chu |
| 2007/0091594 A1 | 4/2007 | Soon |
| 2007/0091954 A1 * | 4/2007 | Li ..................... H01L 21/182 372/43.01 |
| 2008/0013317 A1 | 1/2008 | Hinds |
| 2008/0175006 A1 | 7/2008 | Kellmann et al. |
| 2010/0214774 A1 | 8/2010 | Liu et al. |
| 2011/0018439 A1 | 1/2011 | Fabbri |
| 2012/0042996 A1 | 2/2012 | Glynn |
| 2012/0120642 A1 | 5/2012 | Sreshta et al. |
| 2012/0152306 A1 | 6/2012 | Iqbal et al. |
| 2012/0193660 A1 | 8/2012 | Donofrio |
| 2012/0224359 A1 | 9/2012 | Chun |
| 2012/0242247 A1 | 9/2012 | Hartmann et al. |
| 2013/0335953 A1 | 12/2013 | Gold et al. |
| 2014/0049942 A1 | 2/2014 | Chilton et al. |
| 2014/0118997 A1 | 5/2014 | Snyder |
| 2014/0146525 A1 | 5/2014 | Lueptow |
| 2015/0036325 A1 | 2/2015 | Cohen |
| 2015/0211695 A1 | 7/2015 | Snyder |
| 2016/0215941 A1 | 7/2016 | Salzinger et al. |
| 2016/0363275 A1 * | 12/2016 | Davis ................ F21V 21/22 |

FOREIGN PATENT DOCUMENTS

| | | |
|---|---|---|
| CN | 101576204 A | 11/2009 |
| CN | 101690402 A | 3/2010 |
| CN | 201582579 U | 9/2010 |
| CN | 101886746 A | 11/2010 |
| CN | 201706338 U | 1/2011 |
| CN | 201715273 U | 1/2011 |
| CN | 102116415 A | 7/2011 |
| CN | 202048488 U | 11/2011 |
| CN | 202109228 U | 1/2012 |
| CN | 102403929 A | 4/2012 |
| CN | 202203682 U | 4/2012 |
| CN | 102592522 A | 7/2012 |
| CN | 102668697 A | 9/2012 |
| CN | 202469530 U | 10/2012 |
| CN | 202511013 U | 10/2012 |
| CN | 202581071 U | 12/2012 |
| CN | 202884514 U | 4/2013 |
| CN | 203215307 U | 9/2013 |
| CN | 203489018 U | 3/2014 |
| CN | 302782955 S | 3/2014 |
| DE | 102006022185 | 11/2007 |
| EP | 002289363-0001 | 8/2013 |
| KR | 101061738 B1 | 6/2011 |
| WO | WO 95/33624 A1 | 12/1995 |

OTHER PUBLICATIONS

Goering, L., "Blow-up Solar Lantern Lights up Haiti's Prospects," Thomson Reuters Foundation, Jun. 22, 2012 (4 pages), available at http://www.trust.org/item/20120622150100-k9yos.

Patent Evaluation Report for Chinese Application No. ZL201320570977.8, dated Feb. 26, 2014 (87 pages).

Jonsson, J. Project Soul Cell, YouTube, Oct. 28, 2009 (1 page), available at http://www.youtube.com/watch?v=DG7lkgUUr4M.

European Search Report dated Sep. 23, 2015, European Application No. 13851862.6, pp. 1-5.

International Search Report for International Application No. PCT/US2016/014222, dated Apr. 8, 2016 (2 pages).

MPOWERD Inc., "Build-Your-Own-Luci: Solar Light Kit," video published on Sep. 26, 2017, available at https://www.youtube.com/watch?v=kzeZT-p_6UY.

Multer, J., "MPOWERD, Inc. Makes Foray Into Rapidly Growing STEM Market," dated Oct. 31, 2017, available at https://mpowerd.com/blogs/press/mpowerd-inc-makes-foray-into-rapidly-growing-stem-market.

Ragonetti, P., "MPOWERD BYOL," dated Jan. 4, 2018, available at https://www.coroflot.com/ptrdesignstudio/MPOWERD-BYOL.

* cited by examiner

MODULAR SOLAR-POWERED LIGHTING DEVICES AND COMPONENTS THEREOF

TECHNICAL FIELD

The present disclosure generally relates to modular lighting devices. More particularly, embodiments of the present disclosure include modular, rechargeable lighting devices, powered by solar energy, which may be used as a learning tool for children.

BACKGROUND

As technology advances, education methods change as well. Of particular interest is teaching the science, technology, engineering, and mathematics, often collectively referred to as "STEM." Children have been encouraged to learn these disciplines are through activities and toys outside of the classroom. There is also a need to teach children to be environmentally and socially conscious. Accordingly, certain efforts have been launched to give children, and impoverished countries, devices powered from clean energy, e.g., solar cells. Such devices not only provide a valuable service, but also serve as a tool for generating interest in environmentally or socially conscious behavior.

SUMMARY OF THE DISCLOSURE

The present disclosure includes kit for assembling solar devices. The kit may include a lighting component, at least one light (e.g., a plurality of lights), a power storage component, and a solar component. The lighting component may comprise a first control circuit and at least one light connector operably coupled to the first control circuit, e.g., wherein each light is configured to electrically connect to the at least one light connector of the lighting component. The power storage component may comprise a second control circuit and at least one rechargeable battery operably coupled to the second control circuit. The solar component may comprise a solar panel, e.g., wherein the solar component is configured to supply electricity generated by the solar panel to at least one of the power storage component or the lighting component to illuminate the light(s). According to some aspects of the present disclosure, each of the lighting component, the power storage component, and the solar component includes at least one electronic connector. For example, the kit may include at least one connector, such as a universal serial bus (USB) connector, configured to electrically connect the solar component to at least one of the power storage component or the lighting component. In some examples herein, the power storage component includes at least two electronic connections, e.g., a first electronic connection configured to receive power from the solar component and a second electronic connection configured to provide power to the lighting component.

Each of the lighting component, the power storage component, and the solar component may comprise a housing. In some examples herein, each housing includes one or more mating features for selectively attaching and detaching the housing to at least one other housing of a component of the kit. The housing of each of the lighting component, the power storage component, and the solar component may be any suitable shape, including, e.g., cylindrical. The housing of the lighting component may contain the first control circuit, and the at least one light connector may extend from a first surface of the housing of the lighting component. Additionally or alternatively, the housing of the lighting component may include a plurality of mating features on a second surface of the housing opposite the first surface for attachment to the power storage component or the solar component.

In some examples herein, the kit includes further comprising a cover, e.g., a cover component, configured for attachment to the lighting component. Thus, for example, the cover and the housing of the lighting component may form a chamber that contains the at least one light connector. The housing of the solar component may contain the solar panel. In some examples, at least a portion of the housing covering the solar panel is transparent.

According to some examples herein, the power storage component may include at least one user element operably connected to the second control circuit, wherein the second control circuit configured to control at least one operating mode of the lighting component or the power storage component via the first control circuit when a user actuates the at least one user element. For example, the at least one operating mode may include providing power to the lighting component, terminating power to the lighting component, adjusting an intensity of light emitted by the lighting component, initiating a timed sequence of the lighting component, or a combination thereof. In some examples, the at least one user element includes a first user element for controlling the at least one operating mode of the lighting device and a second user element configured to indicate or provide an indication of an amount of power remaining in the at least one rechargeable battery.

The light(s) of the kit may include one or a plurality of light-emitting diodes (LEDs). For example, at least one LEDs of a plurality of LEDs may be configured to emit a different color of light than at least one of the other LEDs. The lighting component may comprises more lighting connectors than the number of lights provided in the kit. For example, the lighting component may comprise at least six lighting connectors, and the plurality of lights includes at least seven light-emitting diodes (LEDs).

The present disclosure also includes a kit for assembling a solar device that includes a lighting component, a plurality of lights, a cover, a power storage component, and a solar component. The lighting component may comprise a first housing that contains a first control circuit and at least one light connector operably coupled to the first control circuit. Each of the plurality of lights may be configured to be electrically connected to the at least one light connector of the lighting component. The cover may be configured for attachment to the lighting component to form a chamber that contains the at least one light connector. The power storage component may include a second housing that contains a second control circuit and at least one rechargeable battery operably coupled to the second control circuit. The solar component may include a third housing that contains a solar panel, at least a portion of the third housing that covers the solar panel being transparent. The solar component may be configured to supply electricity generated by the solar panel to the power storage component, and the power storage component may be configured to supply power to the lighting component to illuminate the chamber. The first housing of the lighting component may include mating features complementary to a first surface of the second housing of the power storage component, and the third housing may include mating features complementary to a second surface of the second housing opposite the first surface of the power storage component. Exemplary mating features may include, for example, the mating features of the first housing comprise projections, recesses, or a combination thereof.

The present disclosure further includes a modular solar device comprising a lighting component, a cover, a power storage component, and a solar component. The lighting component may comprise a first housing, a first control circuit, and a plurality of light-emitting diodes (LEDs) operably coupled to the first control circuit. The cover may be removably attached to the lighting component, such that the cover and the first housing form a chamber that contains the plurality of LEDs. The power storage component may comprise a second housing, a second control circuit, and at least one rechargeable battery operably coupled to the second control circuit. The solar component may comprise a third housing that contains a solar panel, at least a portion of the third housing that covers the solar panel being transparent. At least one of the second housing or the third housing may be removably attached to the first housing opposite the cover via complementary mating features, and the second housing may be removably attached to the third housing via complementary mating features. The solar component maybe configured to supply electricity generated by the solar panel to the power storage component, and the power storage component may be configured to supply power to the lighting component to illuminate the LEDs.

BRIEF DESCRIPTION OF THE FIGURES

The accompanying drawings, which are incorporated in and constitute a part of this specification, illustrate various exemplary embodiments and together with the description, serve to explain the principles of the disclosed embodiments.

FIGS. 4A and 4B show an exemplary light plug of the device of FIG. 1, wherein

DETAILED DESCRIPTION

Embodiments of the present disclosure include modular lighting devices that may be solar-powered. The devices herein may be used as learning tools, e.g., for children.

Figure 1:
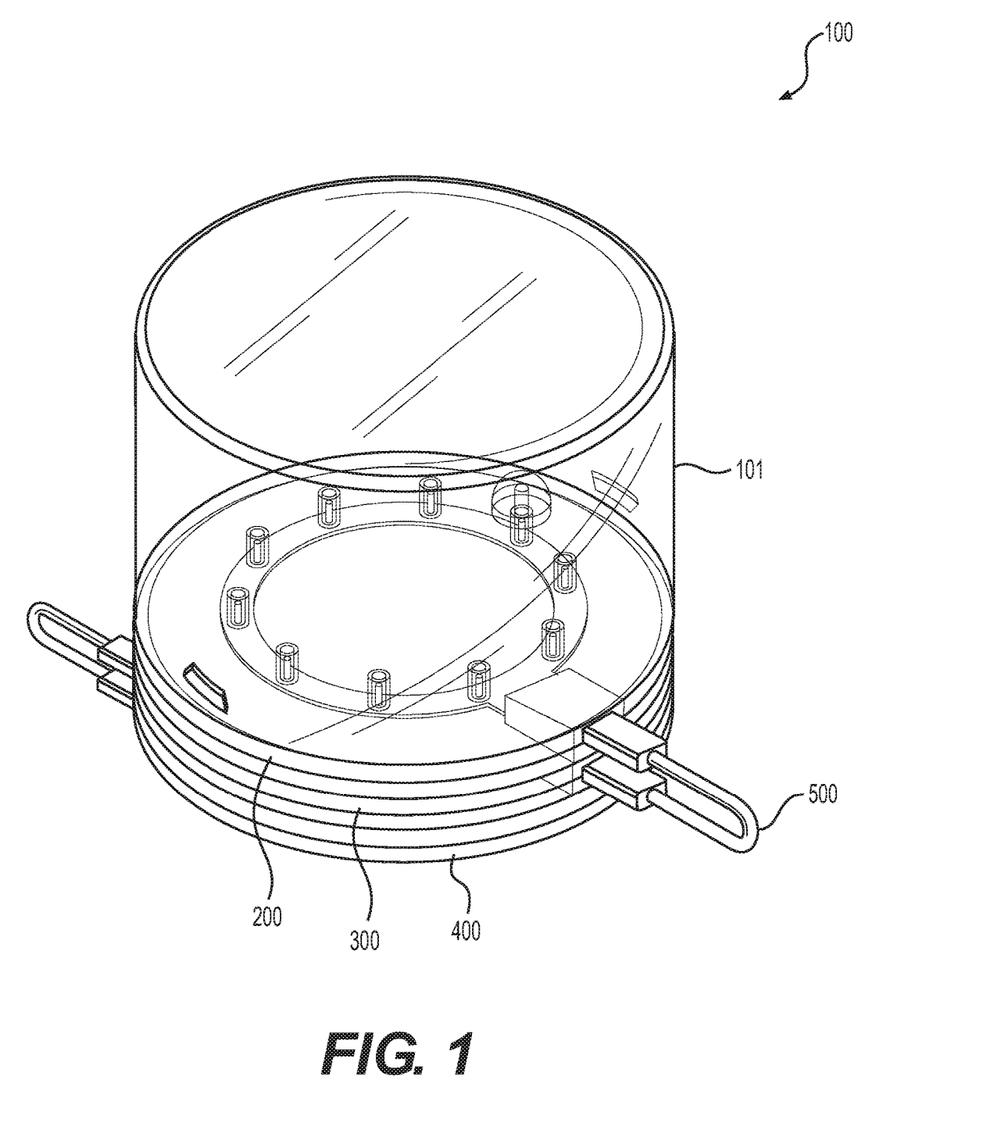
FIG. 1 shows an exemplary device, in accordance with one or more embodiments of the present disclosure.

FIG. 1 illustrates a lighting device 100 comprising a cover component 101, a lighting component 200, a power storage component 300, and a solar component 400 that may be selectively attached and detached from one another in a modular fashion. The device illustrated in FIG. 1 is exemplary only and non-limiting of other configurations and features disclosed herein. For example, other lighting devices in accordance with the present disclosure may comprise only a cover component 101, a lighting component 200, and a solar component 400; a cover component 101, a lighting component 200, and a power storage component 300; a cover component 101, a lighting component 200, two or more solar components 400, and a power storage component, among other possible combinations of components.

The cover component 101 may include a top surface 102 and one or more side walls 104. For example, the top surface 102 may have a diameter (or width, e.g., for non-circular shapes) ranging from about 3 inches to about 12 inches, such as, e.g., from about 4 inches to about 8 inches, or a width of about 3, 4, 5, 6, 7, 8, 9, 10, 11, or 12 inches. Further, for example, the height of the sidewall(s) 104 may range from about 2 inches to about 8 inches, such as, e.g. 4 inches to 6 inches, about 4, 5, or 6 inches. In at least one example, the thickness of the sidewall(s) 104 may range from 0.01 inches to about 0.1 inches, from about 0.02 in. to about 0.08 in., or from about 0.04 in. to about 0.06 in. thick.

As shown in FIG. 1, the cover component 101 may have a generally cylindrical shape, comprising a top surface 102 and one generally cylindrical sidewall 104. In other embodiments, the cover component 101 may be shaped differently, e.g., a frustoconical, spherical, or polyhedral shape (e.g., pyramid, rectangle, star, etc.). For example, for cylindrical configurations as illustrated in FIG. 1, the cover component 101 may include one side wall 104, whereas for other shapes such as, e.g., polygonal (triangular, square, rectangular, pentagonal, hexagonal, octagonal, etc.), the cover component may include two or more side walls 104, e.g., 2, 3, 4, 5, 6, 7, or 8 or more side walls 104. The dimensions of the cover component 101 may be selected based on the desired overall size and shape of the lighting device 100. In some examples, the cover component 101 may be shaped like a sports ball, a figurine, etc.

The top surface 102 and/or the sidewall(s) 104 may include a design, e.g., via etching, embossing, stenciling, adhesive, etc. For example, in the exemplary cover component 101 shown in FIG. 1, a logo is shown engraved in the top surface 102 of the cover component 101. The design may include a symbol representing STEM, solar energy, or environmental conservation, among other examples, and/or may identify a company or product. The design may include different colors, textures, and/or patterns configured to affect the passage or diffusion of light therethrough.

The cover component 101 may be at least partially transparent or translucent, e.g., comprising a clear plastic material, to allow light to pass therethrough. In at least one example, the cover component 101 may comprise hard plastic. For example, the cover component 101 may comprise high-density polyethylene (HDPE), polyethylene terephthalate (PET), thermoplastic elastomers (TPE), polyvinyl chloride (PVC), copolyesters such as Tritan™ (Eastman Chemical Corporation), acrylonitrile butadiene styrene (ABS), or a combination thereof.

Figure 2:
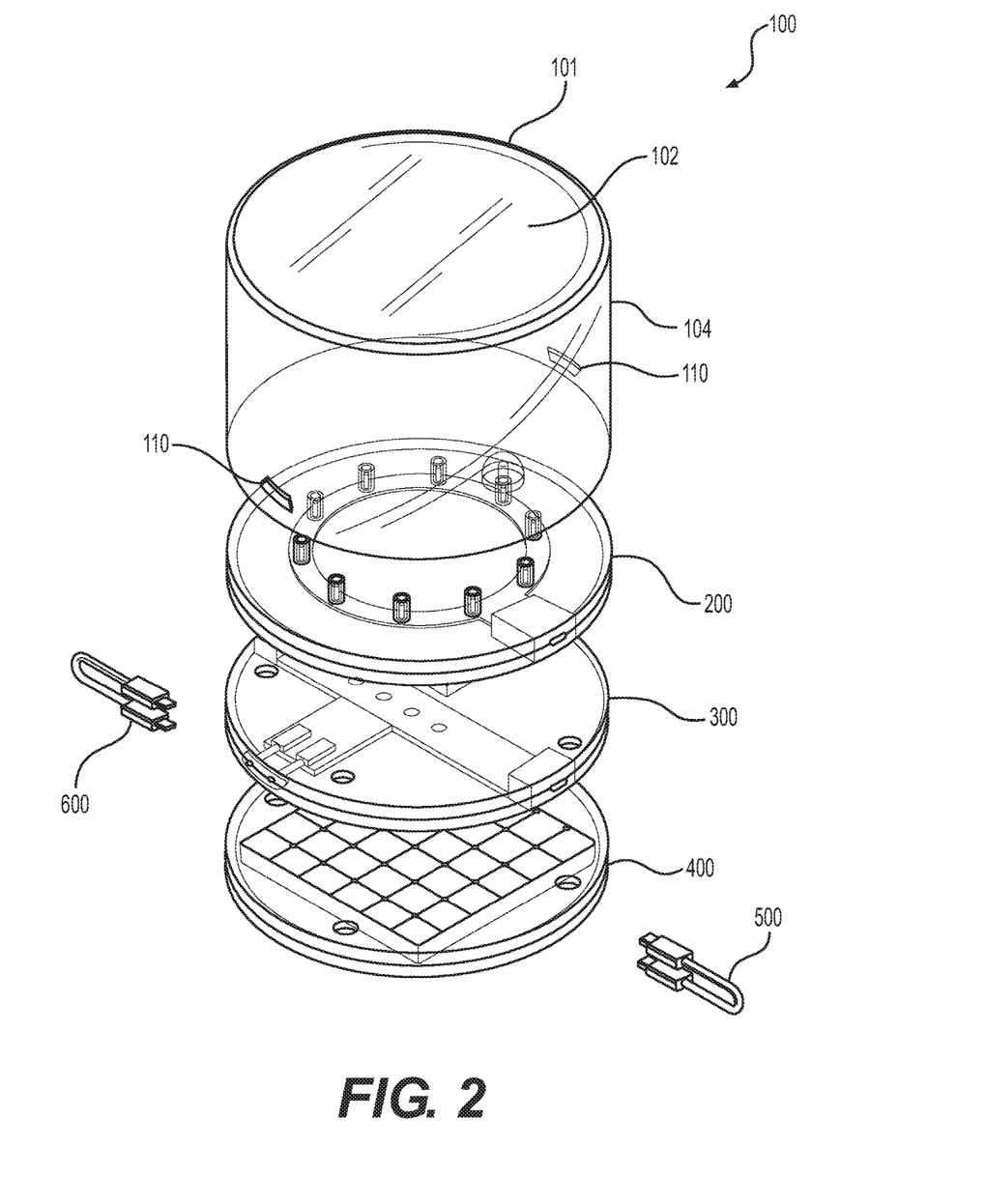
FIG. 2 shows an exploded view of the exemplary device of FIG. 1.

The cover component 101 may be configured to selectively attach and detach to one or more of the other components. As shown in FIG. 1, for example, a lower portion of the cover component 101 may have one or more features such as mating features 110 in order to attach to one of the other components, e.g., the lighting component 200. In FIG. 2, the cover component 101 comprises two protrusions on opposing positions on the interior of the sidewall 104, that may form a snap fit with the lighting component 200 when the base of the cover component 101 is inserted into a corresponding recess of the lighting component 200. In additional or alternative embodiments, the sidewall(s) 104 of the cover component 101 may comprise other suitable mating features, e.g., different types of snap fit configurations, interference fit connections, or threads, among other examples.

Figure 3A:
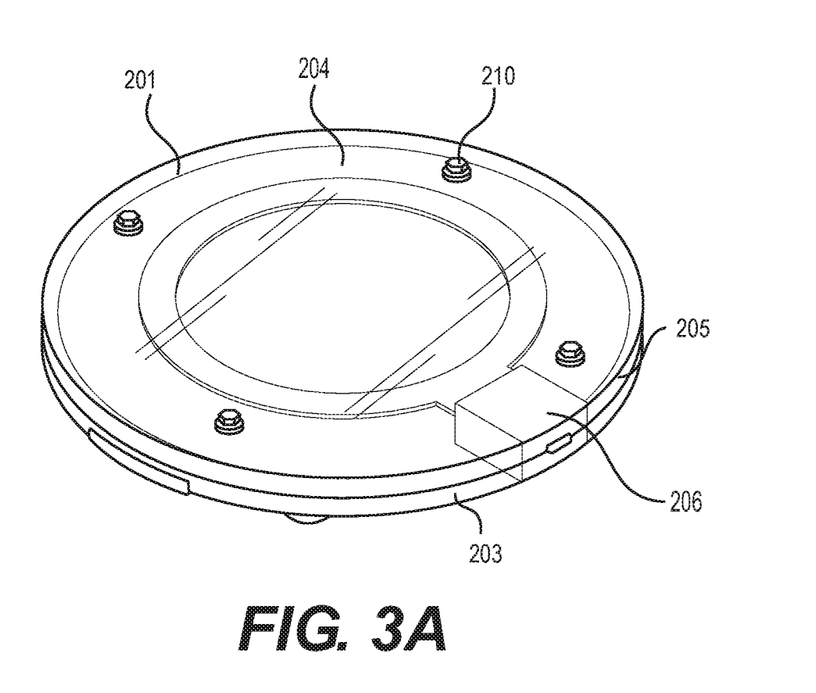
FIGS. 3A and 3B show an exemplary lighting component of the device of FIG. 1.
Figure 3B:
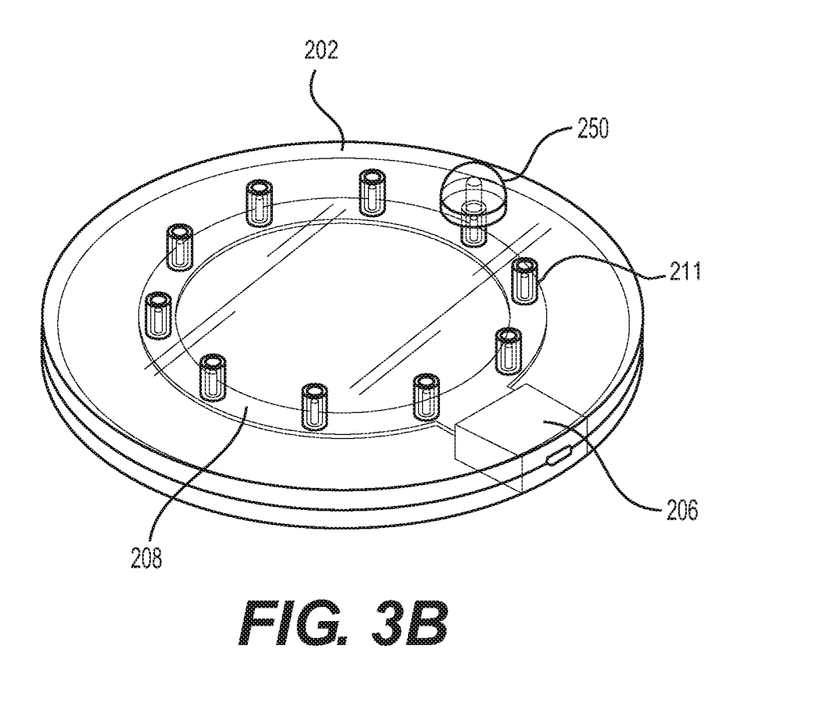

As shown in FIGS. 3A and 3B, the lighting component 200 may comprise one or more of a housing 201, a control circuit 208, and one or more electrical connections 206. As further illustrated by FIGS. 3A and 3B, the lighting component 200 may be generally cylindrically and/or disk shaped, e.g., having a circular cross-sectional shape. In additional examples, the lighting component 200 may have a different cross-sectional shape, such as, e.g., a triangle, a square, a rectangle, etc. The lighting component 200 may have a thickness less than the width (e.g., diameter) of the lighting component. In at least one example, the thickness of the lighting component 200 ranges from about of 0.10 inches to about 1.0 inches, e.g., a thickness of about 0.25, 0.35, 0.45, 0.50, or 0.75 inches, and a diameter (or cross-sectional size) ranging from about 3 inches to about 12 inches, e.g., about 4, 5, 6, 7, or 8 inches.

As shown in FIGS. 3A and 3B, the lighting component 200 may include a housing 201 comprising a first surface 202 and a second surface 204. The housing 201 may be a single integral piece or may comprise two or more pieces coupled together. For example, the housing 201 may comprise a first piece 203 that defines the first surface 202 and a second piece 205 that defines the second surface 204. The first piece 203 and the second piece 205 may be coupled, attached, or otherwise connected together. The connection may be permanent or the pieces may be detachable. For example, the first piece 203 and the second piece 205 may include complimentary threaded connections or other mating elements, such as holes to accommodate one or more screws to couple the two pieces together. In additional or alternative embodiments, the first piece 203 and the second piece 205 may be connected via ultrasonic welding, snap fit connections, press fit connections, adhesive, etc. For example, the first and second pieces (203, 205) may be permanently attached together via a suitable adhesive.

In some examples, the housing 201 comprise structural features to improve or maintain durability of the lighting component 200. For example, the first piece and/or the second piece may comprise support elements (not shown) on an inner wall of each piece. These support elements, e.g., beams, may keep the first piece and the second piece separated by a minimum distance. Additionally or alternatively, the first piece and/or the second piece may include one or more retaining elements for maintain the position of different components, e.g., the control circuit 208, disposed within the housing 201.

The housing 201 may comprise one or more materials with sufficient durability and rigidity to protect internal components of the lighting component 200. For example, the housing may comprise a polymer, e.g., a rigid plastic material. In the case of separate pieces forming the housing, each of the pieces may comprise the same or different materials, such as PET or ABS, e.g., injection-molded ABS. The housing 201 may be at least partially transparent or translucent. The housing 201 may include a design similar to that described above with respect to the cover component 101, e.g., an engraved design of an electric circuit.

As shown in FIG. 3B, the first surface 202 may include one or more electrical connectors 211, e.g., pins, sockets, plugs, jacks, etc., for receiving a corresponding light 250. The connector(s) 211 may provide terminals complementary to the light(s) 250, such that the light(s) 250 may be selectively connected and disconnected from the terminals. In at least one example, each light connector 211 may include a recessed pin complementary to a socket of each light 250. The connectors 211, and thus the lights 250, may have any desired arrangement or configuration on the first surface 202. For example, a plurality of connectors 211 may be disposed in a circular arrangement, as shown, or other configurations such as a star, one or more rows and/or columns, radial formations, two or more concentric circles, or other shapes, etc.

The lights 250 may be positioned or oriented to emit light generally perpendicular to the first surface 202. While the example shown in FIG. 3A includes 10 lights, any number of lights may be used. For example, the device 100 may include only one light 250, or a plurality of 2, 3, 4, 5, 6, 7, 8, 9, 10, 11, 12, 13, 14, 15, 16, 17, 18, 19, or 20 or more lights 250. In some embodiments, for example, the number of lights 250 of the device 100 may range from about 5 to about 25, such as from about 10 to about 20, or from about 12 to about 16 lights. A kit provided for assembling the device 100 may include a number of lights 250 greater than number of connectors 211 of the lighting component 200, allowing for varied light configurations.

Figure 4A:
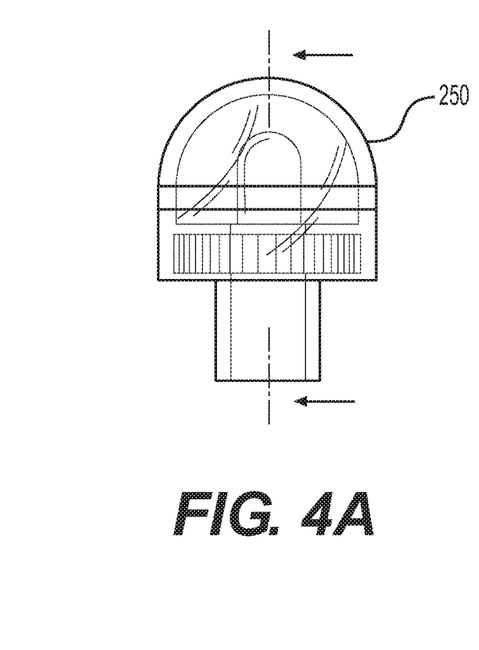
Figure 4B:
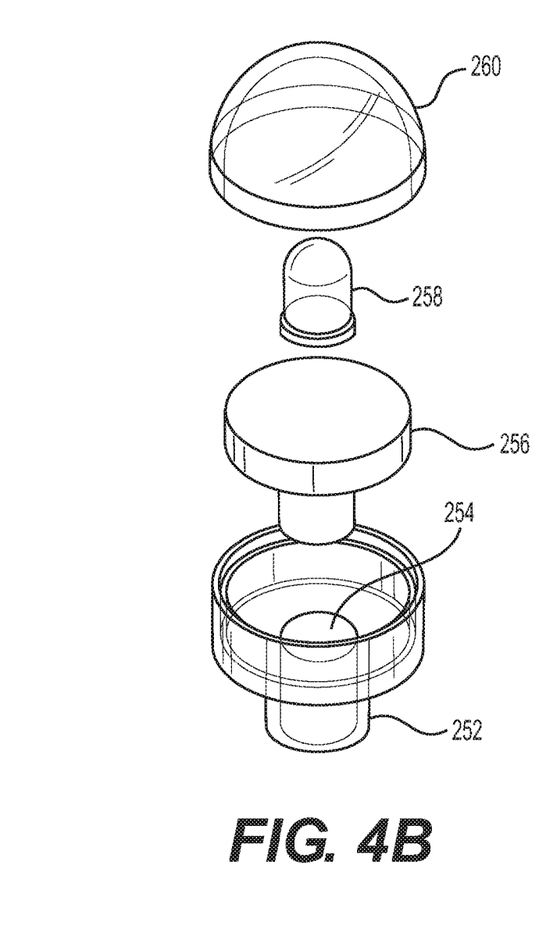
FIG. 4B shows an exploded view of the light of FIG. 4A.

With reference now to FIGS. 4A and 4B, an exemplary light 250 may comprise an electrical port 254, a base 252, a control circuit 256 (e.g., a PCB assembly), a light source 258, and a cap 260. The base 252 may be configured to be removably attached to the connectors 211 of the lighting component 200. The electrical port 254 may be disposed within the base component 252. The light may comprise a control circuit 256 coupled to the base component 252 and operably connected to the electrical port 254.

The light 250 may comprise a light source 258 operably connected to the control circuit 256. In some examples, the light source 258 may comprise a light emitting diode (LED). The light source 258 may have a light output ranging from 10 lumens to 100 lumens, such as, e.g., from about 15 lumens to about 85 lumens, from about 25 lumens to about 75 lumens, from about 35 lumens to about 65 lumens, or from about 45 lumens to about 55 lumens. For example, the light source 258 may have a light output of 10, 15, 20, 25, 30, 35, 40, 45 50, 55, 60, 65, 70, or 75 lumens.

The light source 258 (e.g., LED) of each light 250 may be configured to emit a single color or a plurality of different colors of visible light (e.g., red, orange, pink, yellow, green, blue, violet/purple, and/or white light). For example, each light 250 may be configured to emit a single color, which may be the same or different from the color emitted by one or more other lights 250 attached to the lighting component 200. In some examples, one or more lights 250 may be configured to emit different colors, e.g., based on a pro- grammed algorithm. As mentioned above, a kit for assembling the device 100 may include a plurality of lights 250, each light 250 being configured for attachment to each connector 211 of the lighting device 200, allowing for varied light configurations, combinations of colors, etc. In some examples, one or more lights 250 may be configured to emit infrared light, and/or ultraviolet light, such as UV-A (black-light), UV-B, and/or UV-C. In some embodiments, the light sources 258 may be configured to emit different wavelengths of light, e.g., combinations of visible light LEDs and UV light LEDs, or visible light LEDs and infrared LEDs.

The cap 260 may enclose the light source 258 and attach to the base 252. The cap 260 may be at least partially transparent or translucent to allow light emitted by the light source 258 to pass therethrough. Each light 250 may be provided as a single component with the various parts (base 252, cap 260, etc.) permanently attached together. In other examples, the parts may include detachable connection features that allow a user to selectively assemble and disassemble each light 250. The lights 250 may have dimensions suitable for attachment to the lighting device 200 and housing within the cover component 101. For example, each light 250 may have a height ranging from about 0.8 inches to about 1.0 inch, such as, e.g., about 0.90, 0.92, 0.94, or 0.96 inches. The light 250 may have a width or diameter (measured as the widest dimension of the light 250, e.g., the widest dimension of cap 260) ranging from about 0.50 inches to about 0.75 inches, such as, e.g., about 0.55, 0.60, 0.65, 0.67, or 0.70 inches In at least one example, one or more of the lights may be configured to attach to a surface of at least one other light. For example, one or more lights 250 of a plurality of lights 250 may include features complementary to features of another light 250, e.g., allowing two or more lights 250 to be stacked on top of one another and become illuminated. In at least one example, a first light 250 may have a cap 260 configured to receive a base 252 of a second light 250, wherein the connection between the first and second lights 250 electrically connects the control circuit 256 of the first light 250 to the electrical port 254 and/or the control circuit 256 of the second light 250. Thus, when the first light 250 is attached to a connector 211 of the lighting component 200, both of the first and second lights 250 may be illuminated. The kits herein may include a plurality of lights wherein each light, only a portion of the lights, or none of the lights, is configured for attachment to one or more other lights.

With reference again to FIG. 3B, the light(s) 250 may be operably connected to the control circuit 208 of the lighting component 200. In some embodiments, the electrical port 254 of a light 250 may be configured to receive an electrical connector 211 projecting from the control circuit 208 of the lighting source 200. For example, the electrical connector 211 may extend from the first surface 202 of the housing 201. The control circuit 208 may be disposed between the first surface 202 and the second surface 204 of the housing 201. In addition to the retaining elements described above, the control circuit 208 may be supported by insulating materials, e.g., foam, to maintain the position of the control circuit 208 between the first surface 202 and the second surface 204.

The control circuit 208 may be coupled to one or more electronic connections 206, e.g., to allow for electrical communication with one or more other components of the device 100. As shown in FIG. 3A, the electronic connection 206 may be located between the first surface 202 and the second surface 204, wherein the interface of the connection 206 is located on a side of the housing 201 and accessible for connection to other components. Exemplary electronic connections 206 include, but are not limited to, universal serial bus (USB) and USB-like connectors (USB-A, USB-B, USB-C, micro-USB, etc.) and Thunderbolt or Lightning connectors (e.g., for electronic devices manufactured by Apple). The electronic connections disclosed herein may be male or female connections.

The first surface 202, second surface 204, and/or other portions of the housing 201 such as a side surface or surfaces may include one or more mating features or connecting elements to couple the lighting component 200 to one or more other components, e.g., the cover component 101, the power storage component 300, and/or the solar component 400. Exemplary mating features include, but are not limited to, grooves, recesses, projections, magnets, clamps, complementary threaded portions, latches, Velcro, bolted connections, snap-fit connections, press-fit connections, and combinations thereof.

For example, the housing 201 of the lighting component 200 may include one or more grooves on the first surface 202 configured to receive a lower rim of the cover component 101, such that a snap fit connection is formed between the connecting elements 110 of the cover component 101 and the groove(s) of the housing 201. The groove(s) may be a single annular groove (e.g., when the housing has a circular cross-section, as shown) or a plurality of discrete grooves, e.g., complementary to the location of the connecting elements 110 of the cover component 101. In other examples, the groove(s) may be sized and/or oriented such that the cover component 101 forms a sufficiently secure connection with the housing 201 without connecting elements 110.

Additionally or alternatively, the housing 201 may include one or more mating features on the second surface 204. For example, the second surface 204 may include one or more mating features complementary to corresponding mating features of another component. The mating feature(s) may include one or more projections 210 as shown in FIG. 3A, for example, complementary to corresponding recesses on a surface of another component, e.g., allowing components to be coupled together, such as stacked on top of one another as shown. Each projection 210 may have a size and shape complementary to a corresponding recess of another component of device 100. For example, each projection 210 may extend from about 0.05 inches to about 0.25 inches, e.g., about 0.10, 0.15, 0.17, or 0.20 inches from the housing 201, with the corresponding recess of another component having a similar depth for receiving a corresponding projection 210. Each projection 210 may be generally cylindrical in shape, or any other suitable shape, e.g., triangular, rectangular, etc. In some examples, the housing 201 may include two or more projections 210 that have different shapes and/or positions relative to each other, such that the lighting component 200 may be attached to another component in a lock-and-key fashion that allows for only one orientation of components relative to each other. In other examples, two or more projections 210 may have the same shape and a symmetric positions that allows for the lighting component 200 to be attached to other components in different orientations.

Although the mating elements illustrated in FIGS. 3A, 3B, 5A, 5B, 6A, 6B comprise one or more projections configured to removably connect with one or more recesses of another component, other suitable mating features may be used as mentioned above. For example the components may include complementary mating features such as magnets, clamps, complementary threaded portions (e.g., at or proximate the perimeter of each component), latches, Velcro, bolted connections, snap-fit connections, press-fit connections, or a combination thereof.

Figure 5A:
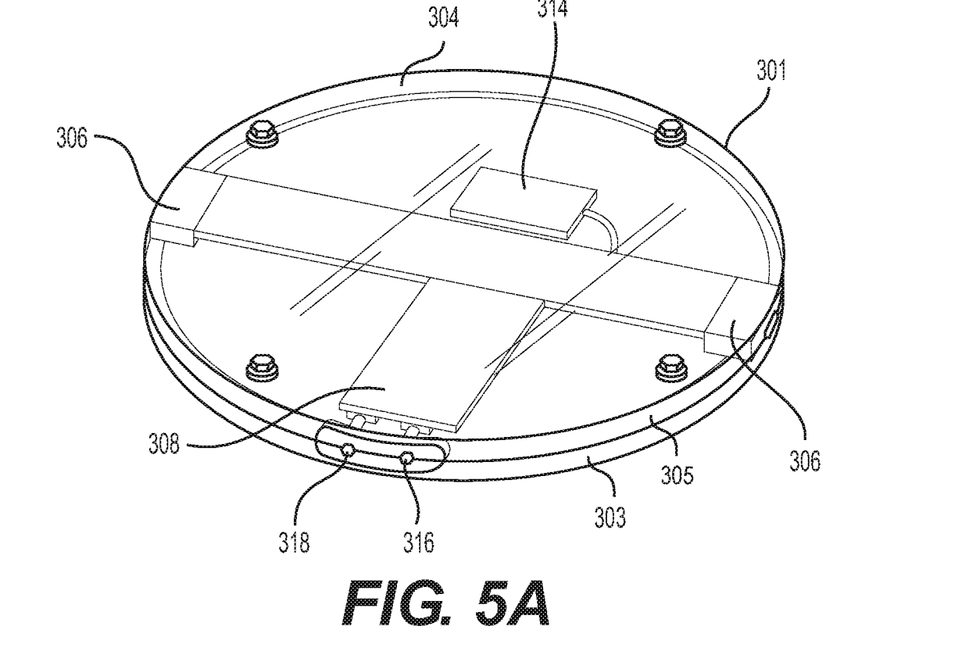
FIGS. 5A and 5B show an exemplary power storage component of the device of FIG. 1.
Figure 5B:
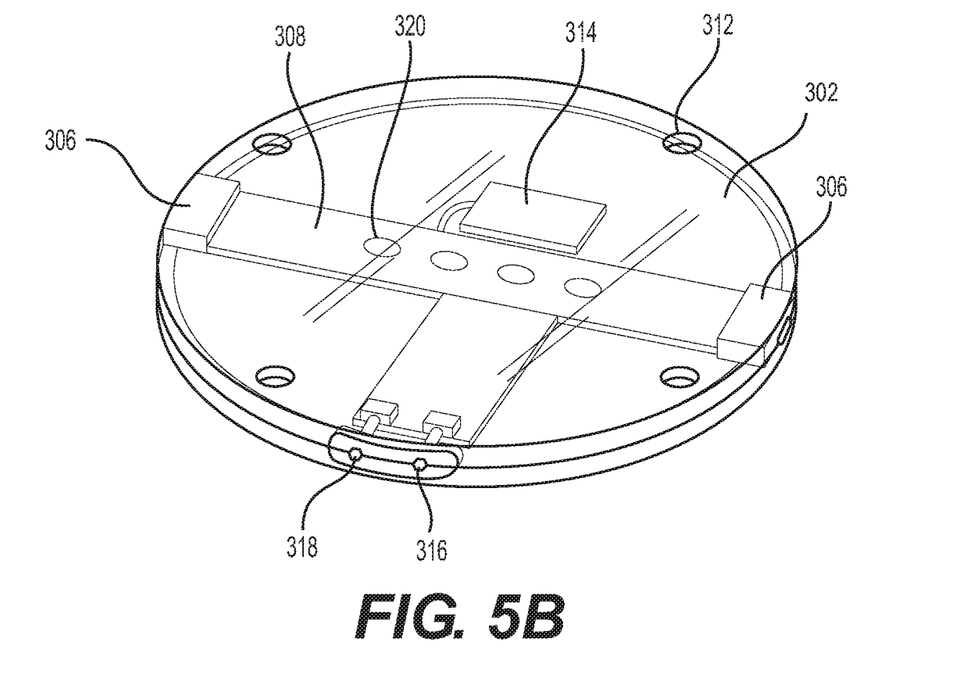

The power storage component 300 may include one or more of a housing 301, a power source 314, a control circuit 308 (e.g., a PCB assembly), and one or more elements or interfaces for receiving user input, such as, e.g., one or more buttons or switches. The housing 301 may include any of the features of the housing 201 of the lighting component 200 described above. For example, the power storage component 300 may include a first part 303 defining a first surface 302 and a second part 305 defining a second surface 304. In some examples, the first surface 302, the second surface 304, and/or a side surface or surfaces of the housing 301 may include one or more mating features, e.g., for attachment to one or more other components of the device 100. Alternatively, the housing 301 may include a single integral piece defining the first surface 302, the second surface 304 opposite the first surface 302, and one or more side surfaces. In some examples, the housing 301 may include a design, e.g., a battery symbol, on the first surface 302 and/or on the second surface 304.

The power source 314 may comprise one or more rechargeable batteries. Exemplary batteries suitable for the device include, but are not limited to, lithium-ion batteries, such as a lithium-ion polymer, and lithium iron phosphate batteries. Each battery may generate a voltage from about 2V to about 5V, such as from about 3V to about 4V, e.g., a voltage of about 3.2V, about 3.5V, about 3.7V, or about 4.0V. Each battery may have a capacity up to at least 2000 mAh, such as a capacity of about 500 mAh, about 750 mAh, about 1000 mAh, about 1250 mAh, about 1500 mAh, about 1750 mAh, or about 2000 mAh. In some examples, power source 314 may be configured to receive energy from the solar panel component 400, and, additionally or alternatively, provide energy to the lighting component 200.

The control circuit 308 may be operably connected to the power source 314 and/or one or more electronic connections 306. For example, the control circuit 308 may be configured to selectively supply and terminate power from the power source 314 to the lighting component 200, e.g. via an electronic connection 306. In additional or alternative examples, the control circuit 308 may be connected to the solar component 400, e.g., via the same or a different electronic connection 306, to receive power from the solar component 400. In the example shown in FIGS. 5A and 5B, the power storage component includes two electronic connections 306 with interfaces opposite one another on side surfaces of the housing 301. Thus, for example, a first electronic connection 306 may be used for electrical communication with the lighting component 200, and a second electronic connection 306 may be used for electrical communication with the solar component 400. The control circuit 308 may be disposed inside the housing 301, e.g., between the first surface 302 and the second surface 304. In some examples, the control circuit 308 may include one or more indicators of a power level of the power source 314. For example, the control circuit 308 may include one or more indicator lights 320, such as LEDs, wherein the number of LEDs illuminated indicates the amount of power stored or remaining in the power source 314 (e.g., 4 lights illuminated for full power, 2 or 3 lights illuminated for partial power, and only one light illuminated for little power remaining).

As mentioned above, the power storage component 300 may include one or more user elements coupled to the housing 301 and accessible to a user. For example, the user element(s) may be disposed on an outermost surface of the housing 301, such as a side surface of the housing between the first surface 302 and the second surface 304. The user element(s) may be operatively coupled to the control circuit 308, such that selection of the user element(s) controls operation of the device 100 and/or provide status information about the device 100 via the control circuit 308. In some examples, the user element(s) include one or more buttons, which optionally may include a rubber or urethane cover for protection. Other suitable user elements may include, for example, switches and other actuators. The one or more user elements may include a power selector 316 (e.g., power button) and/or a charge indicator 318 (e.g., charge button). Each user element optionally may include a design that identifies a function of the respective user element, such as a power symbol and/or charging/lighting icon.

Actuating one or more of the user elements, e.g., the power selector 316, may initiate an operating mode of the device 100, as further described below. Further, for example, actuating one or more of the user elements, e.g., the charge indicator 318, may indicate the relative amount (e.g., percentage) and/or absolute amount of power or charge remaining in the power source 314. In some examples, the charge indicator 318 may turn on one or more of the indicator lights 320, wherein the number of indicator lights 320 illuminated and/or the color of the indicator lights 320 provides information regarding the power level of the device 100. In at least one example, the positions of the indicator lights 320 are aligned with a battery design in a partially transparent first surface 302 or second surface 304, such that actuating the charge indicator 318 turns on one or more indicator lights 320 to shine through the battery design to indicate the charge remaining in the power source 314.

Figure 6A:
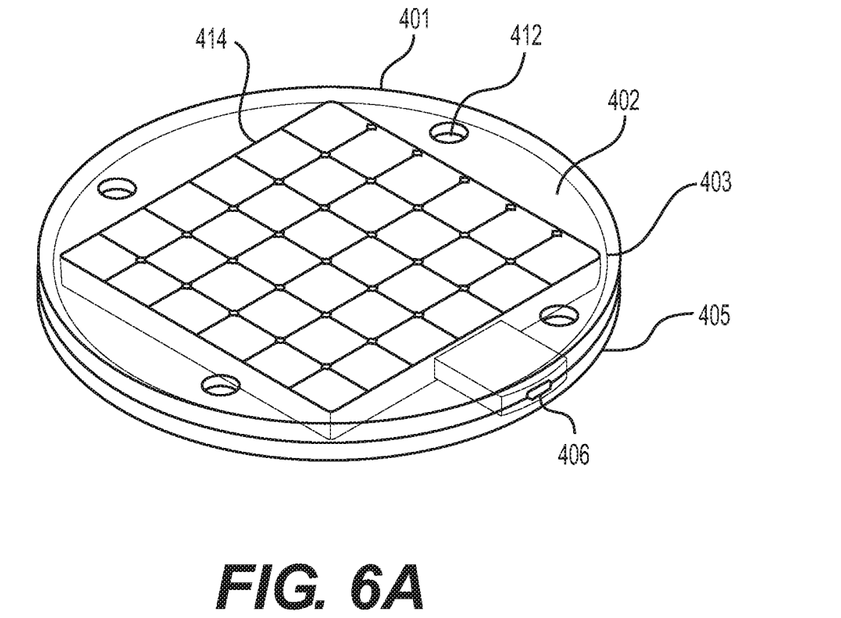
FIGS. 6A and 6B show an exemplary solar component of the device of FIG. 1.
Figure 6B:
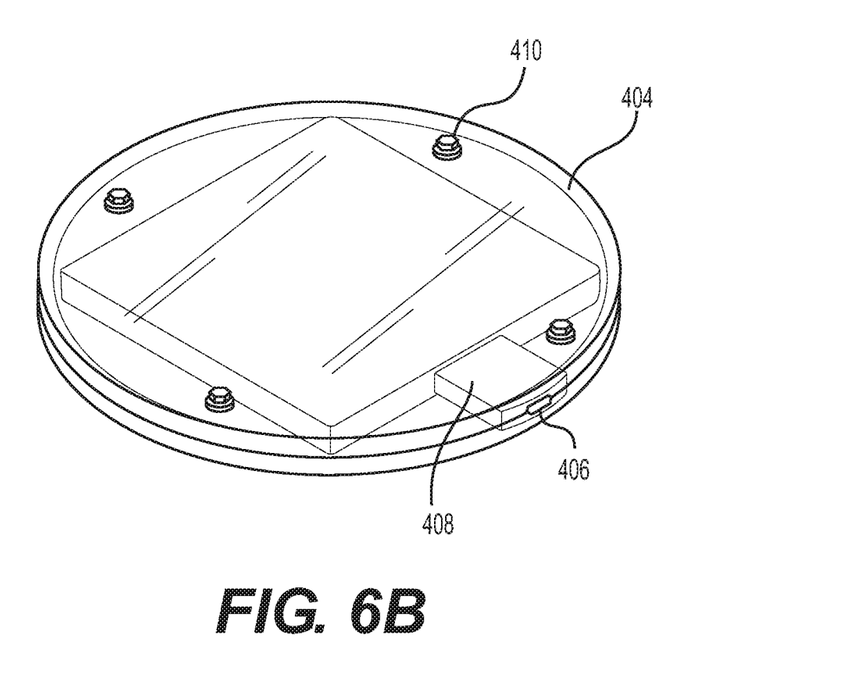

The solar component 400 may include a housing 401, a control circuit 408 (e.g., PCB assembly), one or more electronic connectors 406, and one or more solar panels 414. The housing 401 may include any of the features of the housing 201 of the lighting component 200 and/or the housing 301 of the power storage component 300. For example, the housing 401 may include a first surface 402 and a second surface 404, which may be defined by a single integral housing 401 or by two or more parts, e.g., a first part 403 and a second part 405, similar to the housings 201, 301 described above. In some examples housing 401 may include a design, e.g., a sun and/or other symbols related to, or indicative of, solar energy, on the first surface 402 and/or the second surface 404. The first surface 402 may comprise one or more mating features complementary to one or more other components of the device 100, such as, e.g., recesses 412. The recesses 412 of the first surface 402 of the solar component 400 may be configured to receive a projection from another component, e.g., a projection 210 of the lighting component 200 or the power storage component 300. The projection may form a snap fit connection with the recess. The housing 401 may include one or more retaining elements for maintaining the position of different components, e.g. the control circuit 408 and the solar panel 414, disposed within the housing 401.

Any suitable solar panel may be used in the device 100. In some embodiments, the solar panel 414 may comprise silicon, e.g., polycrystalline silicon, backed by a support material, such as polycarbonate or other plastic or polymer. Exemplary voltages of the solar panel 414 may generally range from about 4V to about 8V, e.g., about 5V, about 6V, or about 7V, but other voltages are encompassed by the disclosure herein. The solar panel 414 may comprise one or more solar cells, e.g., one or more arrays of solar cells. In some examples, the solar component 400 may include two or more solar panels 414, each solar panel 414 including one or more solar cells.

The solar panel 414 may be covered by a protective material configured to allow light to pass therethrough to be received by the solar panel 414. For example, the solar panel 414 may be covered by a transparent or substantially transparent polymer (e.g., plastic) material, such as clear PVC. The cover may allow for protection of the solar panel 414 and/or may be configured to allow natural and/or artificial light to reach the solar panel 414. In turn, the solar panel 414 may generate electricity for charging the power source 314 of the power storage component 300 and/or for providing power to the lighting component 200. For example, the solar panel 414 may be disposed on an outer surface of the housing 401, or the housing 401 may include a transparent portion, e.g., a window, covering and generally corresponding to the dimensions of the solar panel 414 to allow natural and/or artificial light to reach the solar panel 414. Although FIG. 6A illustrates the solar panel 414 facing the first surface 402 of the housing 401, the solar panel 414 may face the second surface 404, or the solar component 400 may include one or more solar panels 414 facing the first surface 402 and one or more solar panels 414 facing the second component 404.

The solar panel 414 may be operably connected to a control circuit 408 as mentioned above. For example, the control circuit 408 may comprise a control circuit 408, e.g., PCB assembly, substantially similar to the control circuits 208, 308 discussed above. In some examples, the solar panel 414 may be disposed opposite the control circuit 408. In other examples, the control circuit 408 may be disposed adjacent to one or more solar cells of the solar panel 414. Control circuit 408 may be coupled to one or more electronic connections 406 to allow for electrical communication between the solar component 400 and the lighting component 200 and/or the power storage component 300.

One or more of the cover component 101, the lighting component 200, the power storage component 300, or the solar component 400 may be selectively attached or detached to one another, e.g. via one or more mating features described above. For example, the cover component 101 may be attached to the lighting component 200. Attaching the cover component 101 to the lighting component 200 may form a chamber that contains the light connector(s) 211 (and light(s) 250 attached to the light connector(s) 211). In additional or alternative examples, the lighting component 200 may be attached to the power storage component 300 and/or the solar component 400, e.g., via one or more complimentary mating features such as the projections and recesses described above. For example the lighting component 200 may be attached to the first surface 302 or second surface 304 of the power component 300 and/or the first surface 402 or the second surface 404 of the solar component 400 In additional or alternative examples, the power storage component 300 may be attached to the lighting component 200 (e.g., via the first surface 202 or the second surface 204) and the solar component 400 (e.g., via the first surface 402 and the second surface 404).

The components herein may be attached in a variety of configurations. In some examples, the components may be attached so that one component is stacked on top of another component. For example, as shown in FIG. 1, the cover component 101 is attached to the first surface 202 of the lighting component 200, the second surface 204 of the lighting component 200 is attached to the first surface 302 of the power storage component 300, and the second surface 304 of the power storage component 300 is attached to the first surface 402 of the solar component 400. When assembled in such a configuration, the device 100 may have a height from about 4 inches to about 8 inches, e.g., 5, 6 or 7 inches, and a width (e.g., a diameter) ranging from 4 inches to 6 inches. These dimensions are exemplary only, and other suitable sizes and dimensions are contemplated herein.

Figure 7:
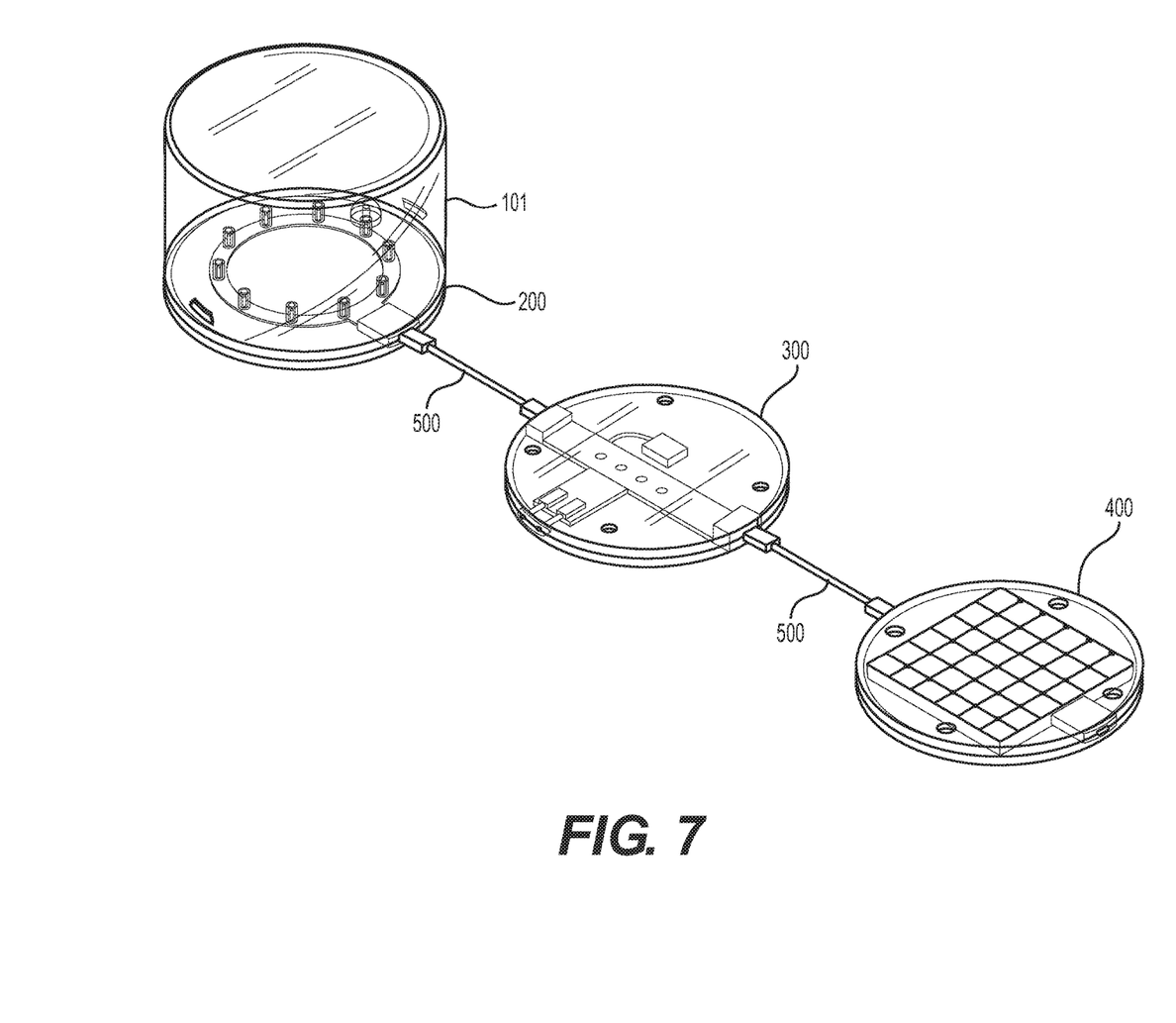
FIG. 7 illustrates a configuration of an exemplary device, in accordance with one or more embodiments of the present disclosure.

One or more of the lighting component 200, the power storage component 300, or the solar component 400 may be operably connected, e.g., via one or more of the electrical connections described above. For example, one or more connectors (500, 600), such as a universal serial bus (USB) cord, may be used to electrically connect one or more of the lighting component 200, the power storage component 300, and/or the solar component 400 together. As shown in FIG. 7, the solar component 400 may be electrically connected to the power storage component 300, which is also electrically connected to the lighting component 200. In such a configuration, energy may be supplied from the solar component 400 to the power storage component 300, which in turn supplies power to the lighting component 200 to illuminate at least one of a plurality of lights 250 attached to the lighting component 200. In additional or alternative examples, the solar component 400 may be electrically connected directly to the lighting component 200. For example, as mentioned, above the solar component 400 may generate electricity (e.g. via the solar panel 414) and supply electricity to the lighting component 200 to illuminate at least light 250 operably connected to the lighting component 200. In further examples, the power storage component 300 may only be electrically connected to the solar component 400 or the lighting component.

As mentioned above, a plurality of lights 250 may be operably connected to lighting element 200, e.g., via electrical port 254. In some examples, the lighting component 200 receives energy from the power storage component 300 and/or the solar component 400, thereby illuminating at least a portion of the lights 250.

As discussed above, power source 314 may be configured to receive energy from the solar component 400 to charge the power source 314. The amount of time required to replete the capacity of the power source 314 from a depleted state to a full state may be referred to herein as the "charge time." In some examples, if the power source 314 only receives power for recharging from the solar component, the charge time may range from about 5 hours and 10 about hours, such as, e.g., about 6, 7, 8 or 9 hours. In additional examples, if power is supplied directly to the power source 300 from an external power source, e.g. a wall outlet, the charge time may range from about 1 hour to about 5 hours, such as, e.g., from about 2 hours to about 3 hours.

The device 100 disclosed herein may be configured to operate according to at least one protocol or operating mode. In some embodiments, the device 100 may be configured to cycle through two or more different operating modes. For initiating different operating modes, the device 100 may accept input via one or more user elements (e.g., a power button or other selector) as described above. In some embodiments, actuating the power selector 316 a certain number of times may signal the device 100 to initiate a particular operating mode. Any of the operating modes of U.S. Pat. No. 9,080,736, incorporated by reference herein, may be used in the present disclosure. For example, pressing the power selector 316 once may initiate a "low" operating mode, illuminating of the lights 250 connected to the device 100 at a relatively low intensity, pressing the power selector 316 twice may increase the intensity of the lights 250 in a "medium" operating mode, pushing power selector 316 three times may further increase the intensity of the lights 250 in a "high" operating mode, pressing the power selector 316 four times may cause the lights 250 to flash, e.g., one second on and one second off, in a "flashing" operating mode, and pressing the power selector 316 five times may turn all of the lights 250 off In additional or alternative examples, pressing the power selector 316 may initiate an operating mode that turns the lights 250 on and off in a timed sequence. The components and devices herein may include fewer or more than these exemplary operating modes.

The operating mode(s) or protocol(s) may be stored on the control circuit 308 of the power storage component 300, e.g., via a microprocessor or a memory storage component. Additionally or alternatively, the operating mode(s) may be stored on the control circuit 208 of the light assembly 200 and/or on the control circuit 408 of the solar component 400. In at least one example, the operating mode(s) may be stored on one component, e.g., the power component 300, from which a signal and/or power is relayed to and received by another component, e.g. the lighting component 200, to operate the device 100.

In some examples, the device 100 may be operated for about 4 hours to about 26 hours, such as, e.g., from about 6 to about 24 hours, from about 8 to about 22 hours, or from about 10 to about 20 hours. For example, the device 100 may operate for about 22 hours to about 26 hours in a "low" operating mode. In another example, the device 100 may operate for about 10 hours to about 14 hours in a "medium" operating mode. In other examples, the device 100 may operate for about 5 hours to about 7 hours in a "high" operating mode. In further examples, the device 100 may operate for about 8 hours to about 10 hours in a "flashing" operating mode.

As alluded to above, one or more of the cover component 101, the lighting component 200, one or more lights 250, the power storage component 300, the solar component 400, and one or more connectors 500 may be provided as a kit. The kit enables a person, such as a child, to physically and/or electrically assemble the device 100 in a number of configurations using the modular components. In some examples, the kit may include a writing, e.g. a booklet or program. The writing may provide instructions for assembling the device, curriculum related to STEM subjects, or other similar subject matter. The kit may additionally or alternatively include stickers, paper cutouts, and/or pens to allow for decorating the various components (e.g., housings).

Any features disclosed herein in connection with one embodiment may be combined with any other embodiments. Other embodiments of the present disclosure will be apparent to those skilled in the art from consideration of the specification and practice of the embodiments disclosed herein. It is intended that the specification and examples be considered as exemplary only, with a true scope and spirit of the disclosure indicated by the following claims.

What is claimed is:

1. A kit for assembling a solar device, the kit comprising:
   a lighting component comprising a first control circuit enclosed within a first housing and at least one light connector operably coupled to the first control circuit, the first housing including a first electronic connection in communication with the first control circuit and the at least one light connector;
   a plurality of lights, each light configured to electrically connect to the at least one light connector of the lighting component;
   a power storage component comprising a second housing that encloses a second control circuit and at least one rechargeable battery operably coupled to the second control circuit, the second housing including a second electronic connection in communication with the second control circuit and the at least one rechargeable battery; and
   a solar component comprising a third housing that encloses a solar panel, the third housing including a third electronic connection in communication with the solar panel;
   wherein the first housing includes one or more mating features complementary to one or more corresponding mating features of each of the second housing and the third housing; and
   wherein the solar component is configured to supply electricity generated by the solar panel to at least one of the power storage component or the lighting component to illuminate at least one light of the plurality of lights.

2. The kit of claim 1, wherein the kit further comprises at least one connector configured to electrically connect the third electronic connection of the solar component to at least one of the second electronic connection of the power storage component or the first electronic connection of the lighting component, the at least one connector being selectively attachable to each of the second electronic connection and the third electronic connection.

3. The kit of claim 2, wherein each of the first electronic connection, second electronic connection, and third electronic connection is a universal bus (USB) connection, and the at least one connector is a USB cord.

4. The kit of claim 1, wherein the second housing of the power storage component includes two second electronic connections configured to receive power from the solar component and to provide power to the lighting component, respectively.

5. The kit of claim 1, wherein at least one of the first housing, the second housing, or the third housing is transparent.

6. The kit of claim 1, wherein each of the first housing, the second housing, and the third housing is cylindrical in shape having a top wall, a bottom wall, and a side wall therebetween.

7. The kit of claim 6, wherein the side wall of the first housing includes the first electronic connection, and the at least one light connector extends through the top wall of the first housing.

8. The kit of claim 1, further comprising a cover configured for attachment to the lighting component, such that the cover and the first housing of the lighting component form a chamber that contains the at least one light connector.

9. The kit of claim 1, wherein at least a portion of the third housing covering the solar panel is transparent.

10. The kit of claim 1, wherein the power storage component includes at least one user element operably connected to the second control circuit, and wherein the second control circuit is configured to control at least one operating mode of the lighting component or the power storage component via the first control circuit when a user actuates the at least one user element.

11. The kit of claim 10, wherein the at least one operating mode includes providing power to the lighting component, terminating power to the lighting component, adjusting an intensity of light emitted by the lighting component, initiating a timed sequence of the lighting component, or a combination thereof.

12. The kit of claim 10, wherein the at least one user element includes a first user element for controlling the at least one operating mode of the lighting device and a second user element configured to indicate or provide an indication of an amount of power remaining in the at least one rechargeable battery.

13. The kit of claim 1, wherein the plurality of lights include light-emitting diodes (LEDs), and at least one of the LEDs is configured to emit a different color of light than at least one of the other LEDs.

14. The kit of claim 1, wherein the lighting component comprises at least six lighting connectors, and the plurality of lights includes at least seven light-emitting diodes (LEDs).

15. A kit for assembling a solar device, the kit comprising:
    a lighting component comprising a first housing, a first control circuit enclosed within the first housing, and at least one light connector operably coupled to the first control circuit and extending through a portion of the first housing;
a plurality of lights, each light including a base complementary to a terminal of the at least one light connector, such that each light is configured to be selectively attached to and detached from the at least one light connector of the lighting component;
a power storage component comprising a second housing that contains a second control circuit and at least one rechargeable battery operably coupled to the second control circuit; and
a solar component comprising a third housing that contains a solar panel, at least a portion of the third housing that covers the solar panel being transparent;
wherein the solar component is configured to supply electricity generated by the solar panel to the power storage component, and the power storage component is configured to supply power to the lighting component to illuminate the chamber; and
wherein each of the first housing, the second housing, and the third housing includes a top surface parallel to a bottom surface, the bottom surface of the first housing including mating features complementary to (i) at least one of the top surface or the bottom surface of the second housing, and (ii) at least one of the top surface or the bottom surface of the third housing, such that the lighting component is configured to be selectively attached and detached from each of the power storage component and the solar component.

16. The kit of claim 15, wherein the second housing has a thickness ranging from about 0.10 inch to about 1.0 inch as measured from the top surface to the bottom surface of the second housing.

17. The kit of claim 15, wherein the mating features of each of the first housing, the second housing, and the third housing comprise projections, recesses, or a combination thereof.

18. A modular solar device comprising:
a lighting component comprising a first housing, a first control circuit enclosed within the first housing, and a plurality of light-emitting diodes (LEDs) operably and removably coupled to the first control circuit via a plurality of light connectors extending through the first housing, wherein the first housing includes a first electronic connection in communication with the first control circuit and the plurality of light connectors;
a cover removably attached to the lighting component, such that the cover and the first housing form a chamber that contains the plurality of LEDs;
a power storage component comprising a second housing that contains a second control circuit and at least one rechargeable battery operably coupled to the second control circuit, the second housing including two second electronic connections in communication with the second control circuit and the at least one rechargeable battery; and
a solar component comprising a third housing that contains a solar panel, at least a portion of the third housing that covers the solar panel being transparent, the third housing including a third electronic connection in communication with the solar panel;
wherein at least one of the second housing or the third housing is removably attached to the first housing opposite the cover via complementary mating features, and the second housing is removably attached to the third housing via complementary mating features; and
wherein the solar component is configured to supply electricity generated by the solar panel to the power storage component via the third electronic connection and one of the two second electronic connections, and the power storage component is configured to supply power to the lighting component to illuminate the LEDs via the other of the two second electronic connections.

19. The kit of claim 15, further comprising a cover configured for attachment to the lighting component, such that the cover and the housing of the lighting component form a chamber that contains the at least one light connector.

20. The modular solar device of claim 18, wherein the second housing is cylindrical in shape having a top wall, a bottom wall, and a side wall therebetween, the two second electronic connections being disposed opposite each other along the side wall.

21. The modular solar device of claim 18, wherein the first housing, the second housing, and the third housing are stacked, and the first electronic connection, the two second electronic connections, and the third electronic connection are disposed along side surfaces of the respective first housing, second housing, and third housing.

* * * * *